United States Patent [19]
Brummett

[11] Patent Number: 5,861,905
[45] Date of Patent: Jan. 19, 1999

[54] DIGITAL TELEVISION SYSTEM WITH ARTIFICIAL INTELLIGENCE

[76] Inventor: Paul Louis Brummett, c/o Waller & Waller, Attorney At Law, P.O. Box 4, Jackson, Miss. 39205

[21] Appl. No.: 700,850

[22] Filed: Aug. 21, 1996

[51] Int. Cl.$^6$ ................................................ H04N 7/16
[52] U.S. Cl. ............................... 348/6; 348/17; 348/143; 348/722; 348/723; 455/6.1
[58] Field of Search .................. 348/14, 17, 15, 348/16, 18, 19, 6, 7, 12, 13, 115, 169, 170, 211, 143, 722, 723, 725, 726, 469, 426; 455/5.1, 6.1, 4.2, 4.1, 3.1

[56] References Cited

U.S. PATENT DOCUMENTS

| | | |
|---|---|---|
| 5,179,442 | 1/1993 | Azadegan et al. . |
| 5,181,229 | 1/1993 | Langlais et al. . |
| 5,184,218 | 2/1993 | Gerdes . |
| 5,231,486 | 7/1993 | Acampora et al. . |
| 5,270,813 | 12/1993 | Puri et al. . |
| 5,285,276 | 2/1994 | Citta . |
| 5,301,242 | 4/1994 | Gonzales et al. . |
| 5,311,308 | 5/1994 | Bernard . |
| 5,335,017 | 8/1994 | Brasoveanu et al. . |
| 5,351,083 | 9/1994 | Tsukagoshi . |
| 5,444,490 | 8/1995 | de With et al. . |
| 5,448,568 | 9/1995 | Delpuch et al. . |
| 5,457,495 | 10/1995 | Hartung . |
| 5,493,329 | 2/1996 | Ohguchi ..................................... 348/14 |
| 5,541,640 | 7/1996 | Larson ....................................... 348/19 |
| 5,596,362 | 1/1997 | Zhou .......................................... 348/14 |
| 5,757,424 | 5/1998 | Frederick ................................. 348/218 |

FOREIGN PATENT DOCUMENTS 2271253  4/1994  United Kingdom .

*Primary Examiner*—Chris Grant
*Attorney, Agent, or Firm*—Richard C. Litman

[57] ABSTRACT

A system of sending digital high definition television pictures and sound in a limited bandwidth using the principle of analyzing and sending changes in pictures and coded instructions rather than entire pictures. Delaying the presentation of the pictures slightly permits major picture changes and sound to be sent at a lower bit rate over a longer period of time. Non-changing areas of the pictures are sent to the receiver and remain on the screen until changes occur or refresh is desired. When TV cameras shift orientation, backgrounds of pictures or objects which do not change are shifted on the receiver with appropriate codes rather than repeating the entire picture. Fast changing portions of pictures are determined and sent more frequently than slower or non-changing ones. Sound information is acquired and compared to libraries of sound fragments. A code (stored or newly created) referring to the appropriate fragment is then sent with the picture information in a series of picture, command/control, and sound data packets. Reception is made with data receiver devices attached to signal reception devices. Presentation of pictures at the receiver is made from bank switched memory prior to D/A conversion. This allows screen data updates to be made prior display. Major screen changes are built up in a special memory bank over a longer period of time before display on the screen. Sound data is matched to the fragment library and played at the appropriate time by a sound reproduction unit.

17 Claims, 4 Drawing Sheets

DIGITAL TELEVISION SYSTEM WITH ARTIFICIAL INTELLIGENCE

BACKGROUND OF THE INVENTION

1. Field of the Invention

The present invention relates to a television system using a narrow bandwidth, for transmitting and receiving high definition, quality television images and sounds.

2. Description of the Prior Art

Standard television has been restricted to the NTSC television standard for transmission of television for many years. The concepts of raster-scanning and interleaving of frames have produced complex and expensive equipment for studios and home TV receivers alike. The conversion to digital TV has been delayed due to bandwidth limitations on existing distribution channels (e.g., broadcast, cable satellite, etc.). Compression of digital TV signals has produced impressive reduction in bandwidths but is not capable of producing high definition digital TV on existing broadcast frequencies without significantly degrading image quality. Existing digital TV consists primarily of sending digital or compressed digital picture and sound signals with synchronizing data in a wide bandwidth signal.

Present TV resolutions need to be improved for increasing consumer requirements. The proposed FCC standard for digital TV requires a 6 MHz bandwidth and involves interlaced and non-interlaced scanned images. This type of system requires multiple repeats of non-changing image areas or compression techniques which reduce the amount of redundant data needed to reproduce images at the receiver location. Considerable overhead, and some loss of picture quality is inherent in these compression techniques such as JPEG (joint photographic experts group) and MPEG (motion picture experts group). The following patent documents are exemplary citations of the above.

U.S. Pat. No. 5,179,442, issued Jan. 12, 1993 to Azadegan et al., discloses a HDTV (high definition television) system compresses the augmentation channel for digital transmission using a QPSK (quadraphase shift keying) compression scheme to reduce the required power on a narrow RF channel having a 3 MHz wide bandwidth. U.S. Pat. No. 5,181,229, issued Jan. 19, 1993 to Langlais et al., describes a data transmission and receiving arrangement utilizing statistic coding by converting digital samples into statistic codewords intermeshed with synchronizing words. U.S. Pat. No. 5,184,218, issued Feb. 2, 1993 to Gerdes, describes a system for interpolating and extrapolating video signals for transmission, in compressed format, for HDTV. U.S. Pat. No. 5,231,486, issued Jul. 27, 1993 to Acampora et al., discloses an HDTV compression system that utilizes a processor for identifying variable length codewords in a data bitstream. Upon the identification, the processor determines whether the codeword is a high priority or standard priority, and ultimately packs the codeword into a respective data packer according to the determined priority type.

U.S. Pat. No. 5,270,813, issued Dec. 14, 1993 to Puri et al., describes an adaptive video encoding and decoding technique which facilitates the transmission, reception, storage, or retrieval of a scalable video signal. The scaling can be realized by adaptively encoding a video signal which is selectively taken from multiplicity of predictions obtained from previously decoded images and of compatible predictions obtained from up-sampling lower resolution decoded images of the current temporal reference. U.S. Pat. No. 5,285,276, issued Feb. 8, 1994 to Citta, describes a bi-rate HDTV signal transmission that compresses each frame of video signal into either a four-level or a two-level data segments, having an established partition between the segments dependent on the effective level of compression. U.S. Pat. No. 5,301,242, issued Apr. 5, 1994 to Gonzales et al., discloses an apparatus and method for encoding still and motion pictures using adaptive quantization in a compression transform technique in order to preserve or improve the quality of the compression.

U.S. Pat. No. 5,311,308, issued May 10, 1994 to Bernard, discloses a method and device for encoding and decoding an HDTV signals so that the broadcasting of HD images in the 16/9 format in a narrow bandwidth outperforms the HD MAC type channel and transmission over a ground wire network or short wave link network. U.S. Pat. No. 5,335,017, issued Aug. 2, 1994 to Brasoveanu et al., discloses an HDTV system that defines the pixels of the images with three equations, such that only the coefficients of the equations need be transmitted, and then only the coefficients of the changing pixels need be transmitted. The remaining portion of the image, i.e., the unchanging pixels, follow a pre-sent set of coefficients. U.S. Pat. No. 5,351,083, issued Sep. 27, 1994 to Tsukagoshi, discloses a system for encoding and/or decoding fast and slow motion region blocks of an image. The system makes a majority decision whether to replace the predetermined block with a surrounding block, thereby enhancing picture quality.

U.S. Pat. No. 5,444,490, issued Aug. 22, 1995 to de With et al., describes a system for producing images of a HDTV system into codeword that remove the complexity of decoding such that the images are more easily retrieved and the quality of the transmission is not diminished. U.S. Pat. No. 5,448,568, issued Sep. 5, 1995 to Delpuch et al., describes an interactive TV transmission system which utilizes compressed audio and video programs that form the transport packets. Video packets, audio packets and application packets are time division multiplexed for transmission or storage. U.S. Pat. No. 5,457,495, issued Oct. 10, 1995 to Hartung, discloses a method of coding a video signal at a fixed bit rate by vector quantizing the signal in an adaptive video coder; this provides a codebook that is updated by comprising coding error of a first frame with the coding error of a next frame. U.K. Patent Document No. 2,271,253, published Apr. 6, 1994 to Wilson, discloses a computer workstation having a video conferencing communication system therein for use in a LAN and having software support modules for processing video data in bit map form in order to provide compatibility between non-compatible hardware formats.

None of the above inventions and patents, taken either singly or in combination, is seen to describe the instant invention as claimed.

SUMMARY OF THE INVENTION

Intelligent TV involves acquiring pictures and sound with an intelligent TV camera or a conventional digital camera. A computer analyzes the images generated from the camera and processes this acquisition of pictures and sound to produce digital data and instructions for storing and ultimately reproducing the pictures using the digital data and instructions rather than sending all the real-time data and synchronizing signals. Reduction of repeated transmitted data to the minimum is intrinsic in the acquisition and pre-processing of image data. Processing of acquired pictures and sound permits transmitting coded packets of data which specify among other things, resolution available, major changes, time data authorization, codes, as well as the changed digital picture element, its location on the screen, and sound data and its corresponding position in time. This system is based on sending changed information on an update basis to the previous image at the receiver location at the appropriate time, usually ahead of display time.

Accordingly, it is a principal object of the invention to provide an intelligent television system.

It is another object of the invention to provide an intelligent television system using computer controlled non-raster scanning techniques of acquiring pictures and sound.

It is a further object of the invention to provide an intelligent television system using computer controlled non-raster scanning techniques of acquiring pictures and sound, by using instruction sets to recreate the picture and sound information without sending the actual complete picture and sound in real-time.

Still another object of the invention is to provide an intelligent television system using computer controlled receivers having corresponding instruction decoders and techniques for acquiring the picture and sound from the transmission channel and generating the picture and sound at the appropriate time.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
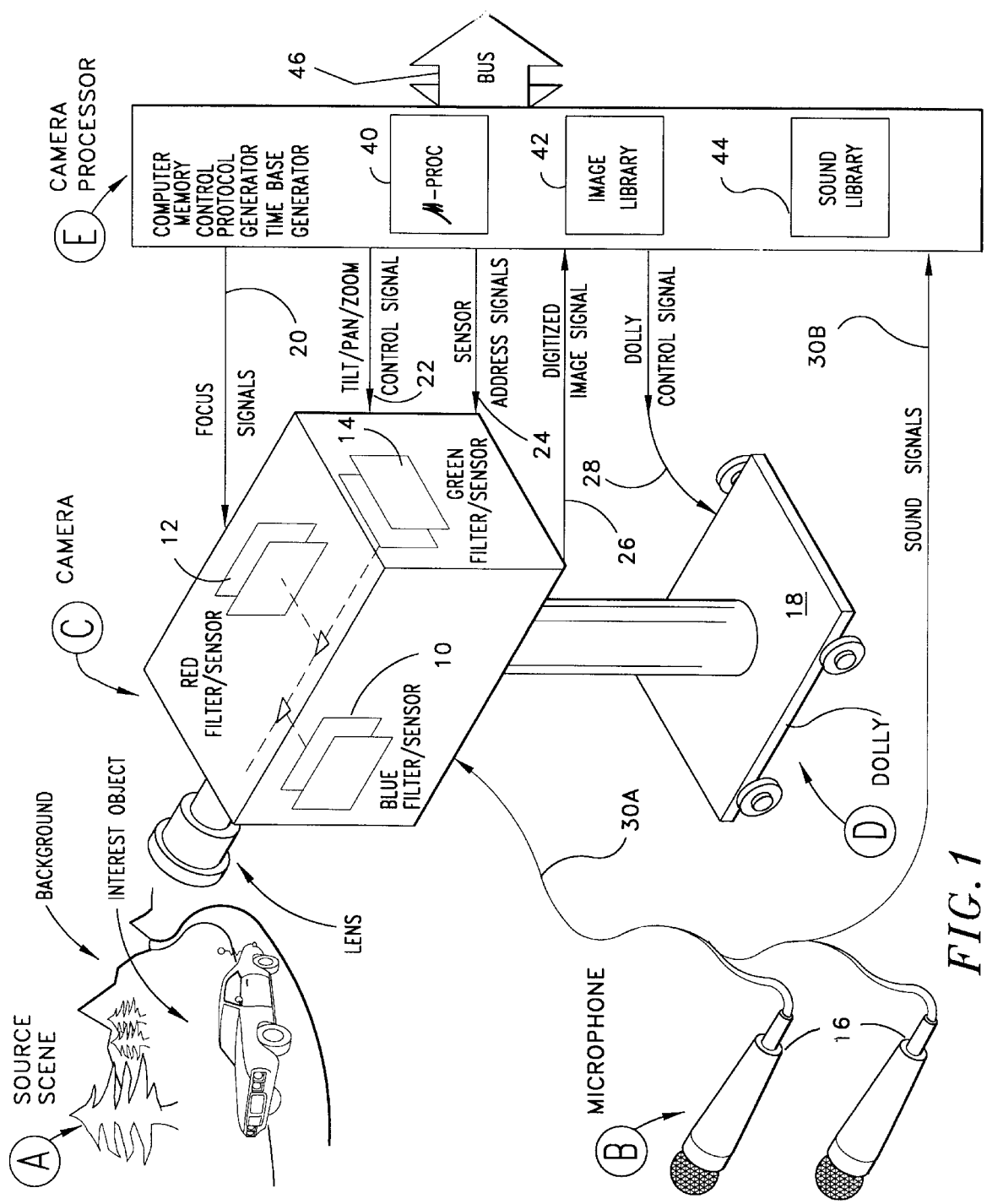
FIG. 1 is a block representation of the intelligent camera of the present invention.

The present invention produces high definition television images and sound in a unique and novel way. An initial image taken by the intelligent camera of the present invention determines two primary sections of the image: the first, the background object; and the second, the foreground or interest object. The interest object is the moving part of the image, whereas the background object is the nearly stationary or stationary part of the image. Referring to FIG. 1, the source scene A, shown for illustrative purposes, has a background object (the scenic mountain roadway) and an interest object (the car traveling on the roadway). This picture consists of various programmed patterns or methods based on the nature of the picture. Once the scene changes or a new or totally changed picture occurs, a BSC (Big Screen Change) is built up over a period of time, using various tools such as a solid background in an appropriate color, background areas being sent in lower resolution, and high-interest areas being sent in higher resolution, and filling in details over a period of time. The screen can be divided into shapes or patterns of progressive priority status and the higher priority areas or patterns of progressive priority status and the higher priority areas or patterns updated more often and in more detail.

Zooms, tilts pans, and dolly movements can utilize background and non-changing image areas previously stored in memory. This permits the background and non-changing image element changes to be made with instructions to the receiver instead of sending many repetitions of the background information that has already been sent. This is similar to the Foley or "Blue screen techniques" used in motion picture studios today. Signals are sent through whatever means of transmission is appropriate. Resolution is limited only by the total bandwidth available. Specifications for low, medium and high resolutions can be changed as technology advances and various bandwidth channels are selected, e.g., satellite, phone lines, conventional TV channels, and new TV channels. The TV receiver has a digital receiving device or modem-like device to receive the data and instructions, and uses a computer to interpret the instructions, store the information, and display pictures and sound at the appropriate time. CRT type displays or static type displays can both be utilized. The picture and sound data are transferred from the memory array to the screen and sound system in an update fashion. Memory page-swap techniques are used; in this way an incomplete picture or sound being built up over time is not presented until complete. Major picture scene changes, BSC, may be presented immediately when completed, as a result of accumulation of picture data over a longer period of time in preparation for it. Sound is broken down into sound elements or fragments, and codes for each sound element or fragment are sent instead of the complete sound itself or a rapidly sampled sound. Sound element libraries can be updated on the TV receiver in the background of the TV signals, during periods of lower activity. Similarly, BSC data can be increased during periods of lower regular data flow. This produces a more uniform data stream and makes better use of the frequency spectrum.

The intelligent camera C is generally shown in FIG. 1, having conventional beam splitters in line with the lens for separating the image colors, and presenting the colors to the blue filter/sensor 10, the red filter/sensor 12, and the green filter/sensor 14. A camera C is supported atop a moveable dolly 18. The control of the camera C is done via camera processor E, consisting of at least, microprocessor 40, image library memory block 42, and sound library memory block 46. The camera processor provides a lens focus control signal 20, a tilt/pan/zoom control signals 22, RGB filter/sensor address signal 24, and dolly control signals 28. Also, the camera processor E receives, at least, digitized image signals 26, and from microphones 16, sound signals 30B. Camera C also receives the sound signal at 30A for acquiring the proper address associated with the corresponding digitized image signal 28.

The microprocessor 40 receives the digitized image signals 28 and the sound signals 30A (via 28) and 30B, and formulates the address codes for the series of picture elements, command/control, and sound data packets. The data packets contain addresses of the particular image or sound fragments stored in the memory blocks 42 and 44, along with newly created codes for recreating the image or sound fragments not stored in the memory blocks 42 and 44. The camera processor E is in direct communication via data bus 46 with the studio processor F (note FIG. 2). Camera processor E is either integrally formed with camera C or may be a separate unit, that is used in close proximity with camera C.

Figure 2:
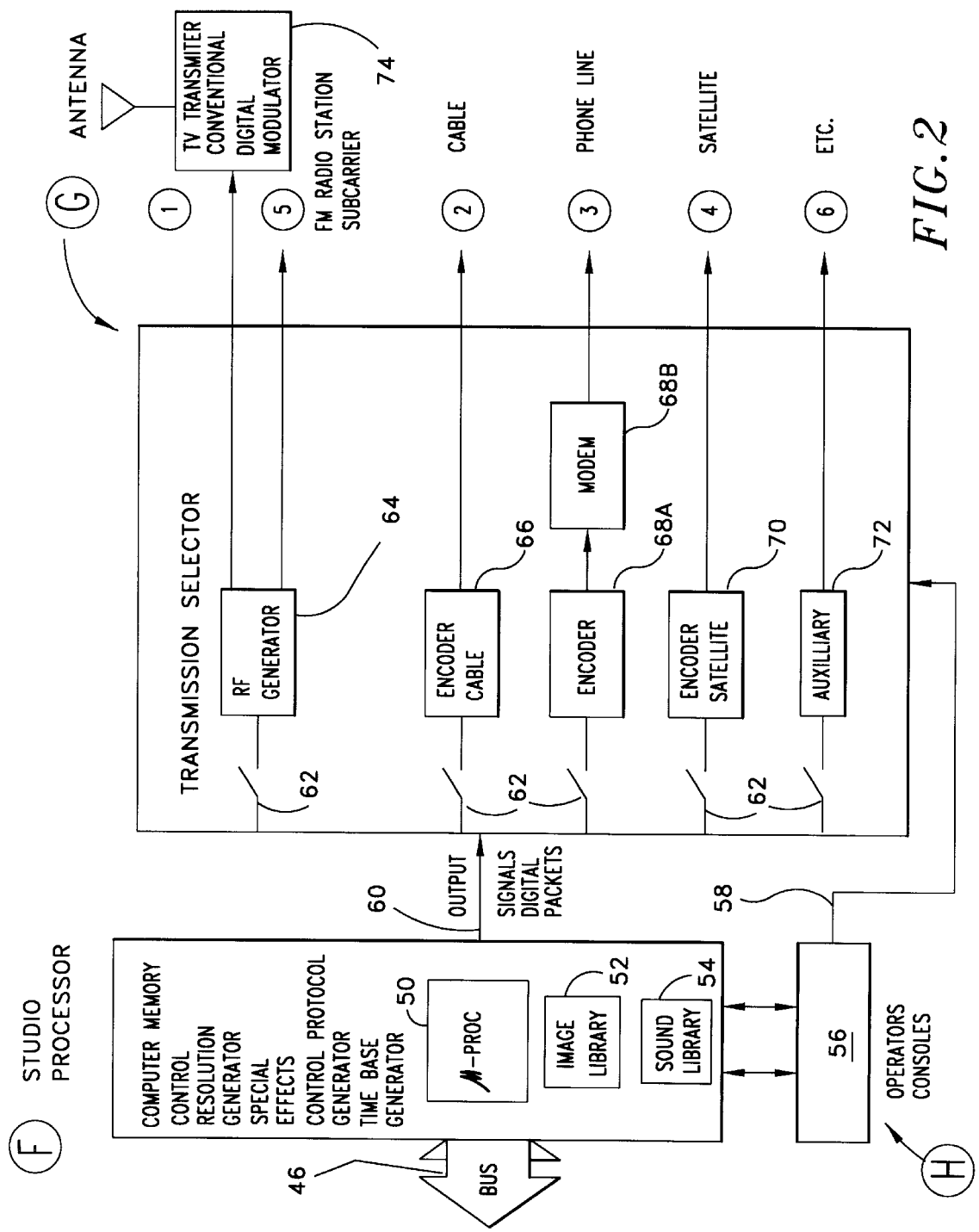
FIG. 2 is a block representation of the studio processing of the present invention.

As seen in FIG. 2, the studio processor F receives data packets via data bus 46 from camera processor E. The studio processor F also receives input instructions from operator consoles 56 (e.g., keyboard, video/sound mixer, etc.). The operator also can control the camera via the operator consoles 56, studio processor F, across bus 46, to camera processor E. The data packets received by studio processor F are further manipulated by microprocessor 50 by verifying the addresses allocated to the image and sound fragments also stored in memory blocks 52 and 54. In addition, the microprocessor 50 further formulates the appropriate bitstream of data packets in correct transmission scheme. The studio processor F produces the necessary or further processing of the image and sound fragments by creating a storage location and address code for each newly created fragment, placing the newly created fragment and code into the bitstream as a command/control packet for transmission. The studio processor F releases the data packet bitstreams at output 60. The output 60 is fed into a transmission selector G that receives control signals and instructions from the operator consoles 56 on line 58. The transmission selector G has a multiple of available devices for transmitting the output data bitstreams from studio processor F.

By the multiplexing function, illustrated as switches 62, any one of or multiple of devices are used. Generally, an RF generator 64 is used for producing a signal for broadcast transmission across a TV transmitter 1 or radio FM band 5 using the appropriate modulator techniques. Likewise, a direct link transmission scheme may be used, such as a cable TV encoder 66 feeding a cable TV subscriber 2, or a encoder 68A and modem 68B feeding a telephone line 3. In addition, high energy transmission devices such as satellite encoders 70 for satellite sources 6 may also be used. Transmission selector G includes an auxiliary device (e.g., tape) 72 for accommodating any other transmission technology, via line 6.

The intelligent camera has sensors or control motors on each mechanical function. The dolly and head motion is precisely controlled and recorded. Images are converted to digital and sent to the camera processor. The camera processor may be part of the camera or separate. Conventional cameras can be utilized with the appropriate processor. Background and non-changing portions of the picture are stored in memory along with zoomed and adjacent areas. The movement of the camera and zoom produces this data. Provision is made for the camera processor to examine the pictures to establish background and non-moving objects and portions of the picture involving high interest or activity. Priorities are established for examining and transmitting picture data libraries are used where appropriate, of picture objects or portions of pictures. Codes are generated when referring to library items. Time base information, picture portion information, major picture change information, and other pertinent data are processed into packets. A data stream consisting of packets with different types of data is generated and sent to the studio processor. Camera selection, special effects, operator interaction and control, and resolution selection are made at this time. The appropriate mix of packets is sent by the desired means such as broadcast, cable, CD or tape, to the receiver.

Figure 3:
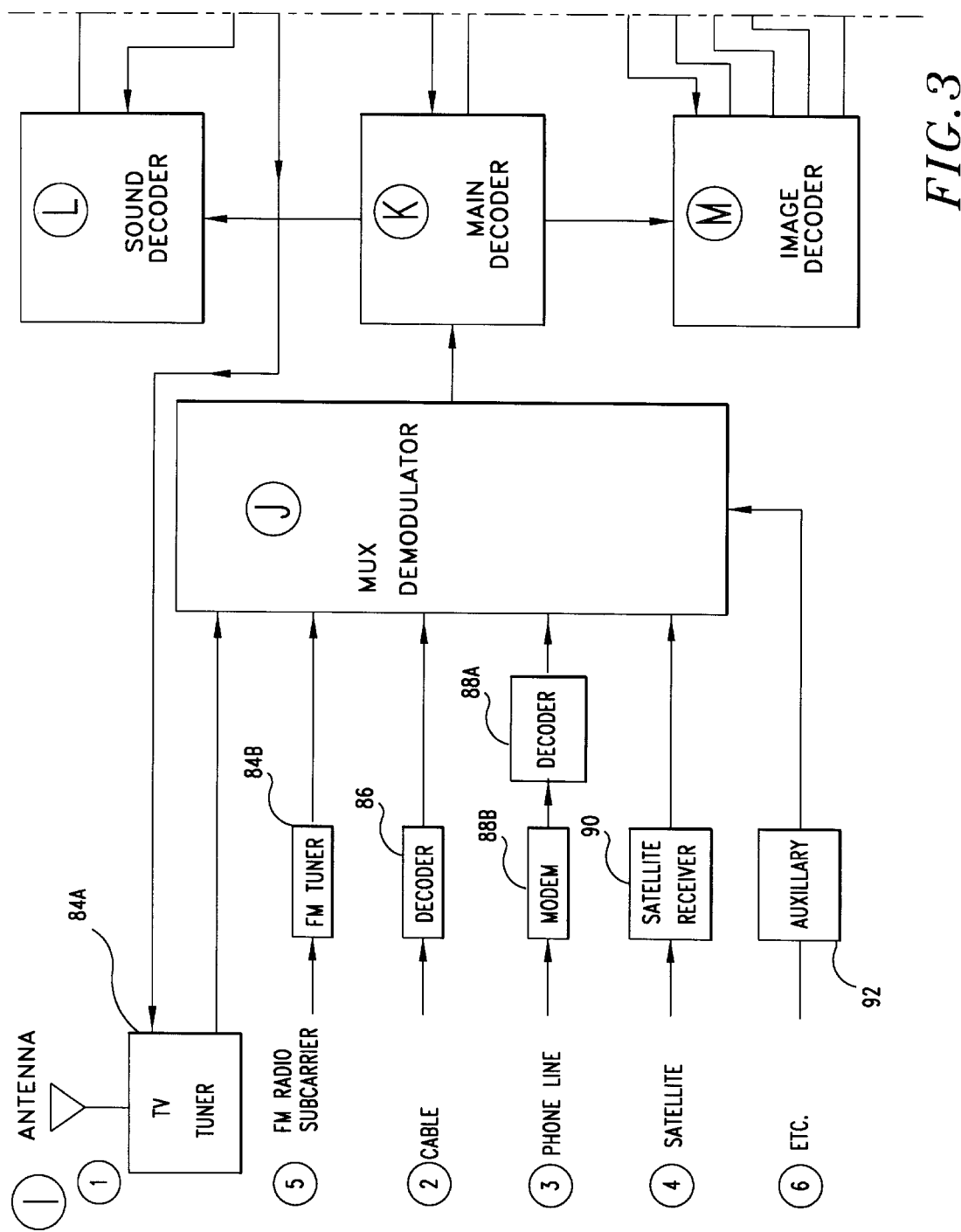
FIG. 3 is a block representation of the intelligent receiver of the present invention.
Figure 4:
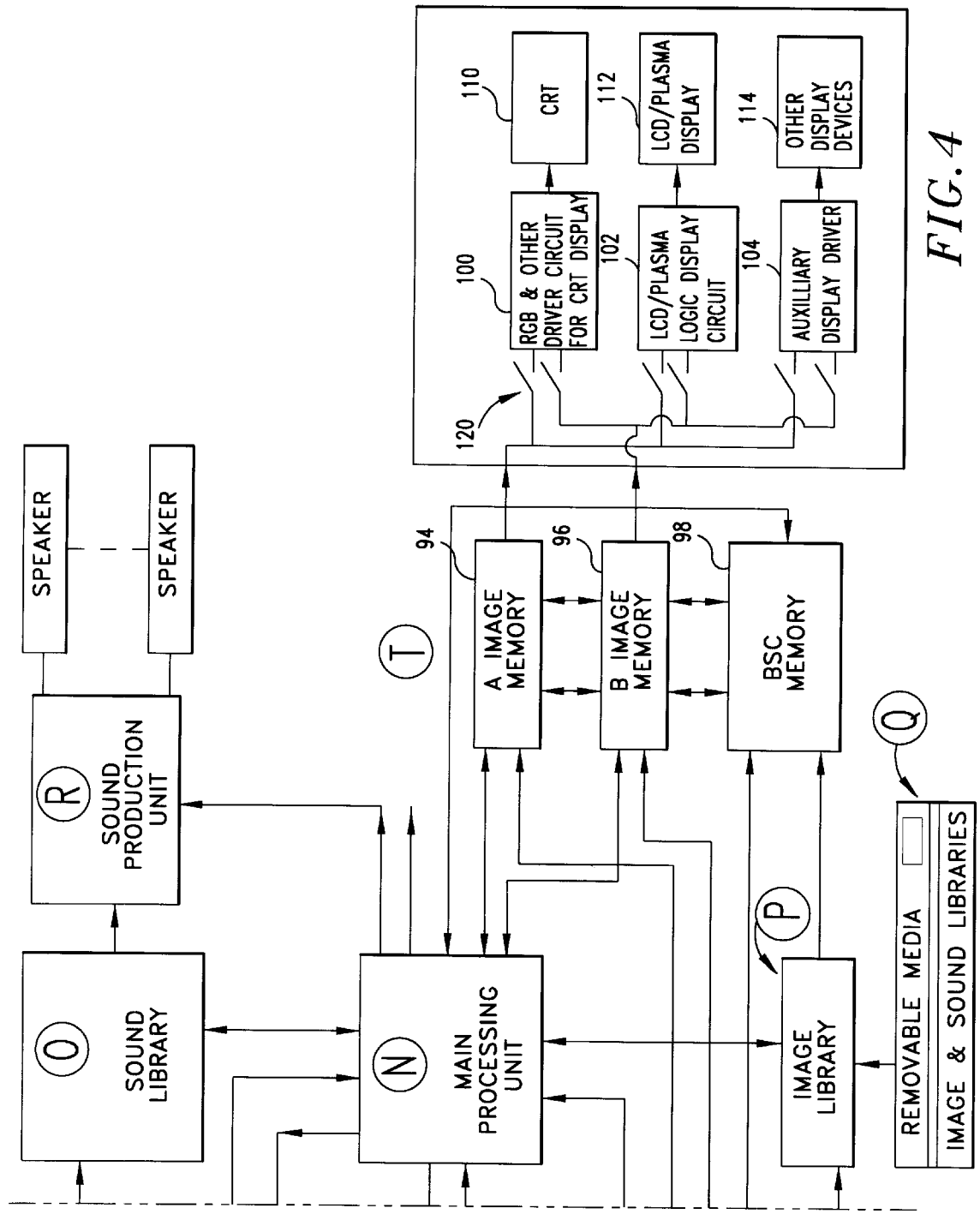
FIG. 4 is a block representation of the display processing of the present invention.

FIGS. 3 and 4 illustrate the reception portion of the present invention. A corresponding receptor 1–6 receiving the transmission from the associated transmission device (note FIG. 2), feeds the also associated signal conditioner. For example, TV tuner 84A, radio FM tuner 84B, cable decoder 86, modem 88B and decoder 88A, satellite dish receiver 90, or auxiliary device (e.g., tape) 92 each receive the transmitted output from the studio processor F via transmission selector G. The received data streams are fed into a multiplexing demodulator J for determining for which receptor 1–6 the signal is being received, and then the data streams are fed to a main decoder K. Main decoder K separates each code and delivers to the appropriate module. That is, the image codes are delivered to the image decoder M, the sound codes are delivered to the sound decoder L, and the command/control codes are delivered to the main processing unit N.

The image decoder M decodes the newly created image fragments along with the digital address locations for storage in the image library memory block P. The sound decoder L decodes the newly created sound fragments along with the digital address locations for storage in sound library memory block O. main processing unit N decodes the command/control codes which give the instructions to main processing unit N to use in processing the sound and image addresses supplied from the sound decoder L and image decoder M. The main processing unit N uses the addresses to locate and retrieve the images and sounds from the respective sound library memory block O and image library memory block P. Additionally, main processing unit N accesses a supplemental storage device (Q) via image library memory block P for other codes, addresses, image fragments, and sound fragments that have been prepared for special circumstances, not regularly used in an ongoing basis. This way the intelligent receiver saves on having extensive memory blocks, thus resulting in lower costs. The main processing unit N further manipulates the data to control the sound reproduction unit R which, at the appropriate time, will reproduce the complete sounds initially transduced by microphones 16. Simultaneously, main processing unit N will manipulate the data to control the image generating section T. Image generating section T consists of at least three memory subsections for building the images derived from the transmitted data stream. First, the BSC memory 98 subsection accumulates the data in advance for a complete change of the image. The BSC image data packets are interspersed in the flow at less active image times to balance the data flow without harsh visual effects, i.e., flashes. The A image memory 94 and the B image memory 96, under the control of main processing unit N, provide alternating access to changing images so as to eliminate visible screen changes, i.e., flicker.

The main processing unit N submits the control signals to the chosen form of display by operating a display selector 120 which couples the A, B, and BSC image memories of image generating section T. The main processing unit N selects the appropriate circuit (100, 102, 104) for administering the image display. These circuits each function similarly to the video controller cards of a personal computer, in that they frequently scan the A, B, and BSC memory contents and display an image according to the image data represented therein. The final display units (110, 112, 114) represent the visual display devices for producing the images originally taken by the intelligent camera C.

Generally, at the receiver, the corresponding input (tape, broadcast, radio, cable, satellite, etc.) is tuned, received, and demodulated. The main decoder then determines the type of each of the packets and routes them to the appropriate decoder (i.e., sound, picture, or control). The picture decoder then utilizes the appropriate picture memory libraries and assigns the data to the appropriate memory array. For the normal sequence of updates, the non-displaying memory banks are chosen. Major change data is used to update the BSC memory bank, while the minor updates are sent to the A or B memory bank, depending on which one is displaying. The main processing unit monitors the time aspects and displays the appropriate memory bank on the screen by associated circuit (which includes a D/A converter. The sound packets are routed to the sound decoder where the sound libraries are examined and the matching code used to access the appropriate sound fragment. The sound data is then sent to the sound reproduction unit, at the appropriate time, where a D/A conversion occurs before the sound reproduction unit amplifies and emits the sounds. Mono, stereo, quad, or any other multi-channel sound is usable with this system. The main processor is able to determine the resolution of the picture and the characteristics of the sound, and this allows various options to be used on receivers for a broad audience. Low resolution sound and picture information can be intermixed with higher resolution data.

Although the primary representation of the present intelligent television system is commercial TV, this system can be used in many other applications, for providing inexpensive remote imaging protocols. For instance, hospitals may this system for internal remote imaging over the telephone lines, theater chains may transmit satellite images as simulcasts to various locations, and many other useful and/or entertainment applications too numerous to mention are readily apparent. Additionally, the synthetic sound system intrinsic in this TV system may be used in numerous other applications, even in situations where the image portion is not necessary.

It is to be understood that the present invention is not limited to the sole embodiment described above, but encompasses any and all embodiments within the scope of the following claims.

I claim:

1. An intelligent television system for producing high definition picture and sound images for broadcast, direct link, satellite and teleconferencing, comprising:

camera means having red/green/blue filters/sensors for taking non-raster scanned changing and non-changing images and producing a digital code representing each image;

microphone means for receiving sounds and producing signal representative of the sounds;

camera processor means for receiving said digital code from said camera means and said signals from said microphone means, said camera processor means including means for addressing the non-changing digital image codes and the changing digital image codes to an image memory location, said camera processor means including means for addressing said signals to a sound memory location;

means for coupling said signals from said microphone means to said camera means and said camera processor means, said camera means including in said digital image codes, a corresponding sound code for said image;

studio processor means having an operator input device for manipulating the digital codes generated by the camera processor means, said studio processor means separating the non-changing digital codes and changing image codes, identifying the non-changing codes in a memory unit, identifying the sound codes in another memory unit, and producing transmission signals based on the addressed memory locations of the non-changing image codes and the addressed memory locations of the sound codes, and producing transmission signals of the changing image codes as data packets;

bus means for providing a bi-directional communication coupling between said camera processor means and said studio processor;

output transmission means responsive to said operator input device, and said studio processor means for selectively transmitting said codes;

wherein, said output transmission means selectively transmits said codes according to a format chosen from the group consisting of RF broadcast, direct link, satellite and teleconferencing;

receiver means for receiving said codes form said output transmission means having demodulator means, said receiving means providing said image and said sound codes at an output thereof;

decoder means for receiving said codes from said receiver means and generating data packets representative of the received codes;

receiver processor means for receiving the data packets from said decoder means, said receiver processor means accessing stored images and sounds for producing images from said codes of said non-changing images and said sounds, said receiver processing means also generating image signals and sound signals from said codes of said changing images and sounds, said receiver processor generating image and sound signals at an output thereof; and display means having a display memory unit and a display unit, said display means receiving from the output of said receiver processor means, said changing image signals, said non-changing image signals and said sound signals, said display means allocating said signals in an appropriate memory location of said display memory unit, said display unit accessing the signals stored in said display memory unit, and generating images and sounds based on said stored signals;

wherein, the non-changing images are coded such that as the camera means alters position, a corresponding shift of the complete non-changing image occurs while the instantaneous changes of the changing images are produced, thus requiring a narrower bandwidth of the transmitted signals;

whereby high definition images and sounds are produced.

2. The system according to claim 1, further comprising moveable support means for supporting said camera means, said camera processor means also providing control signals to operate said moveable support means.

3. The system according to claim 1, wherein said camera means have adjustment means therein for adjusting the focus, tilt, pan, zoom, and iris aperture, said camera processor means providing control signals for controlling said adjustment means of said camera means.

4. The system according to claim 3, further comprising moveable support means for supporting said camera means, said camera processor means also providing control signals to operate said moveable support means.

5. An intelligent television generating system for producing high definition picture and sound images for broadcast, direct link, satellite and teleconferencing, comprising:

camera means having red/green/blue filters/sensors for taking non-raster scanned changing and non-changing images and producing a digital code representing each image;

microphone means for receiving sounds and producing signals representative of the sounds;

camera processor means for receiving said digital code from said camera means and said signals from said microphone means, said camera processor means including means for addressing the non-changing digital image codes and the changing digital image codes to an image memory location, said camera processor means including means for addressing said signals to a sound memory location;

means for coupling said signals from said microphone means to said camera means and said camera processor means, said camera means including in said digital image codes, a corresponding sound code for said image;

studio processor means having an operator input device for manipulating the digital codes generated by the camera processor means, said studio processor means separating the non-changing digital codes and changing image codes, identifying the non-changing codes in a memory unit, identifying the sound codes in another memory unit, and producing transmission signals based on the addressed memory locations of the non-changing image codes and the addressed memory locations of the sound codes, and producing transmission signals of the changing image codes as data packets;

bus means for providing a bi-directional data communication coupling between said camera processor means and said studio processor;

output transmission means responsive to said operator input device, and said studio processor means for selectively transmitting said codes; and means for receiving and displaying said high definition picture images and sounds;

wherein, said output transmission means selectively transmits said codes according to a format chosen from the group consisting of RF broadcast, direct link, satellite and teleconferencing.

6. The system according to claim 5, further comprising moveable support means for supporting said camera means, said camera processor means also providing control signals to operate said moveable support means.

7. The system according to claim 5, wherein said camera means have adjustment means therein for adjusting the focus, tilt, pan, zoom, and iris aperture, said camera processor means providing control signals for controlling said adjustment means of said camera means.

8. The system according to claim 7, further comprising moveable support means for supporting said camera means, said camera processor means also providing control signals to operate said moveable support means.

9. The system according to claim 5, said receiver and display means further comprise means for receiving said codes transmitted from said output transmitter means having demodulator means, said receiving means providing said image and said sound codes at an output thereof, and display means having a display memory unit and a display unit, said display means receiving from the output of said receiver processor means said changing image signals, said non-changing image signals and said sound signals, said display means allocating said signals in an appropriate memory location of said display memory unit, said display unit accessing the signals stored in said display memory unit, and generating images and sounds based on said stored signals.

10. The system according to claim 9, further comprising decoder means coupled to said receiver means for receiving said codes from said receiver means and generating data packets representative of the received codes, receiver processor means for receiving the data packets from said decoder means, said receiver processor means accessing stored images and sounds for producing images from said codes of said non-changing images and said sounds, said receiver processing means also generating image signals and sound signals from said codes of said changing images and sounds, said receiver processor generating image and sound signals and delivering said signals to said display means.

11. The system according to claim 9, further comprising moveable support means for supporting said camera means, said camera processor means also providing control signals to operate said moveable support means.

12. The system according to claim 9, wherein said camera means have adjustment means therein for adjusting the focus, tilt, pan, zoom, and iris aperture, said camera processor means providing control signals for controlling said adjustment means of said camera means.

13. The system according to claim 12, further comprising moveable support means for supporting said camera means, said camera processor means also providing control signals to operate said moveable support means.

14. The system according to claim 5, said output transmission means being responsive to said operator input device for transmitting high definition picture and sound signals in a narrow bandwidth by selecting one of the group consisting of broadcast, direct link, satellite and teleconferencing.

15. An intelligent television reception system for producing high definition picture and sound images from broadcast, direct link, satellite and teleconferencing, comprising:

HDTV transmitter means for transmitting codes of non-changing images and sounds and changing images and sounds;

receiver means for receiving said codes from said HDTV transmitter system means having demodulator means, said receiving means providing said image and said sound codes at an output thereof;

decoder means for receiving said codes from said receiver means and generating data packets representative of the received codes;

receiver processor means for receiving the data packets from said decoder means, said receiver processor means accessing stored images and sounds for producing images from said codes of said non-changing images and said sounds, said receiver processing means also generating image signals and sound signals from said codes of said changing images and sounds, said receiver processor generating image and sound signals at an output thereof; and display means having a display memory unit and a display unit, said display means receiving from the output of said receiver processor means said changing image signals, said non-changing image signals and said sound signals, said display means allocating said signals in an appropriate memory location of said display memory unit, said display unit accessing the signals stored in said display memory unit, and generating images and sounds based on said stored signals;

wherein, the non-changing images are coded such that as said HDTV transmitter system alters position, a corresponding shift of the complete non-changing image occurs while the instantaneous changes of the changing images are produced, thus requiring a narrower bandwidth of the transmitted signals;

whereby high definition images and sounds are produced by said display means.

16. The system according to claim 15, said HDTV transmitter means comprises:

camera means having red/green/blue filters/sensors for taking non-raster scanned changing and non-changing images and producing a digital code representing each image;

microphone means for receiving sounds and producing signal representative of the sounds; and camera processor means for receiving said digital code from said camera means and said signals from said microphone means, said camera processor means including means for addressing the non-changing digital image codes and the changing digital image codes to an image memory location, said camera processor means including means for addressing said signals to a sound memory location.

17. The system according to claim 16, further comprising:

studio processor means having an operator input device for manipulating the digital codes generated by the camera processor means, said studio processor means separating the non-changing digital codes and changing image codes, identifying the non-changing codes in a memory unit, identifying the sound codes in another memory unit, and producing transmission signals based on the addressed memory locations of the non-changing image codes and the addressed memory locations of the sound codes, and producing transmission signals of the changing image codes as data packets;

bus means for providing a bi-directional communication coupling between said camera processor means and said studio processor; and output transmission means responsive to said operator input device, and said studio processor means for selectively transmitting said codes.

* * * * *